(12) United States Patent
　　　Kono et al.

(10) Patent No.: US 10,795,535 B2
(45) Date of Patent: Oct. 6, 2020

(54) MANAGEMENT OF MULTIPLE DISPLAY AREAS

(71) Applicant: EIZO Corporation, Ishikawa (JP)

(72) Inventors: Takahiro Kono, Ishikawa (JP); Yoichi Ohoto, Ishikawa (JP); Masaki Kita, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 114 days.

(21) Appl. No.: 14/424,747

(22) PCT Filed: May 10, 2013

(86) PCT No.: PCT/JP2013/063144
§ 371 (c)(1),
(2) Date: Feb. 27, 2015

(87) PCT Pub. No.: WO2014/034189
PCT Pub. Date: Mar. 6, 2014

(65) Prior Publication Data
US 2015/0293663 A1　　Oct. 15, 2015

(30) Foreign Application Priority Data

Aug. 28, 2012 　(JP) ................................. 2012-187825

(51) Int. Cl.
　　*G06F 3/0481*　　(2013.01)
　　*G06F 3/0488*　　(2013.01)
　　(Continued)

(52) U.S. Cl.
　　CPC ........ *G06F 3/04812* (2013.01); *G06F 3/0481* (2013.01); *G06F 3/04847* (2013.01);
　　(Continued)

(58) Field of Classification Search
　　CPC ............. G06F 3/04812; G06F 3/04886; G06F 3/04847; G06F 3/0481; H04N 5/45
　　See application file for complete search history.

(56) References Cited

U.S. PATENT DOCUMENTS 5,047,754 A * 9/1991 Akatsuka ................ G06F 3/033
　　　　　　　　　　　　　　　　　　　　　　　345/1.1
5,305,435 A * 4/1994 Bronson ............... G06F 3/0481
　　　　　　　　　　　　　　　　　　　　　　　715/775

(Continued)

FOREIGN PATENT DOCUMENTS

CN　　　101765823 A　　6/2010
EP　　　　1956838 A2　　8/2008

(Continued)

OTHER PUBLICATIONS

Tom's Hardware, Dual screen with "remote" second screen and control on first monitor, https://forums.tomshardware.com/threads/dual-screen-with-remote-second-screen-and-control-on-first-monitor.768651/ (Year: 2010).*

(Continued)

*Primary Examiner* — Justin R. Blaufeld
(74) *Attorney, Agent, or Firm* — Maier & Maier, PLLC

(57) ABSTRACT

Provided are a display control method by which the user can cause, with enhanced ease of use, one display device to display multiple screens, and a computer program, a display control device, and an image display system. A working area generation unit generates multiple areas corresponding to multiple display areas displayed on a display screen and positions the generated areas in a working area. When only a display area A (parent screen) is displayed on the display screen (when the PinP function is disabled), a pointer position monitoring unit determines whether the pointer position has moved from an area a to an area b and outputs the determination to a simultaneous display command gen- (Continued)

eration unit. If so determined, the simultaneous display command generation unit outputs a PinP function enable command to a display device.

9 Claims, 14 Drawing Sheets

(51) Int. Cl.
*H04N 5/45* (2011.01)
*G06F 3/0484* (2013.01)

(52) U.S. Cl.
CPC ........... *G06F 3/04886* (2013.01); *H04N 5/45* (2013.01); *G06F 2203/04803* (2013.01)

(56) References Cited

U.S. PATENT DOCUMENTS

| | | | | |
|---|---|---|---|---|
| 5,329,369 | A * | 7/1994 | Willis | H04N 3/223 348/556 |
| 5,420,643 | A * | 5/1995 | Romesburg | H04N 3/223 348/561 |
| 5,434,625 | A * | 7/1995 | Willis | H04N 3/223 348/564 |
| 5,485,174 | A * | 1/1996 | Henshaw | G06F 3/0485 345/684 |
| 5,585,821 | A * | 12/1996 | Ishikura | G06F 3/0481 345/1.1 |
| 5,969,697 | A * | 10/1999 | Tani | G06F 3/038 345/2.1 |
| 6,091,395 | A * | 7/2000 | DeStefano | G06F 3/0481 715/788 |
| 6,133,918 | A * | 10/2000 | Conrad | G06F 3/0481 715/804 |
| 6,313,880 | B1 * | 11/2001 | Smyers | H04L 12/40117 348/552 |
| 6,373,500 | B1 * | 4/2002 | Daniels | G06F 3/023 345/632 |
| 6,493,008 | B1 | 12/2002 | Yui | |
| 6,597,383 | B1 * | 7/2003 | Saito | G06F 3/04812 345/157 |
| 6,738,028 | B2 * | 5/2004 | Asahi | G06F 3/1423 345/1.1 |
| 6,774,886 | B2 * | 8/2004 | Okuda | G06F 3/038 345/156 |
| 7,142,192 | B2 * | 11/2006 | De Waal | G06F 3/038 345/157 |
| 7,164,714 | B2 | 1/2007 | Martin | |
| 7,564,425 | B2 * | 7/2009 | Martinez | G06F 1/1601 345/1.3 |
| 8,191,008 | B2 | 5/2012 | Ramnani | |
| 8,839,292 | B1 * | 9/2014 | Miloseski | H04N 21/47205 725/37 |
| 9,201,567 | B2 * | 12/2015 | Schrauben | G01C 23/00 |
| 2001/0028365 | A1 | 10/2001 | Ludolph | |
| 2002/0167460 | A1 * | 11/2002 | Baudisch | G06F 3/1446 345/3.3 |
| 2004/0113888 | A1 * | 6/2004 | De Waal | G06F 3/038 345/157 |
| 2005/0275641 | A1 * | 12/2005 | Franz | H04N 5/45 345/204 |
| 2006/0123353 | A1 * | 6/2006 | Matthews | G06F 3/0482 715/779 |
| 2007/0022389 | A1 * | 1/2007 | Ording | G06F 3/0482 715/790 |
| 2007/0195060 | A1 * | 8/2007 | Moscovitch | G06F 3/0219 345/157 |
| 2007/0252822 | A1 | 11/2007 | Kim et al. | |
| 2008/0082937 | A1 * | 4/2008 | Bennah | G06F 3/04812 715/781 |
| 2008/0216127 | A1 | 9/2008 | Shanks | |
| 2008/0229227 | A1 | 9/2008 | Bantz et al. | |
| 2009/0037822 | A1 | 2/2009 | Kandekar et al. | |
| 2009/0193364 | A1 * | 7/2009 | Jarrett | G06F 3/04817 715/838 |
| 2009/0237562 | A1 | 9/2009 | Fujiwara et al. | |
| 2010/0064260 | A1 * | 3/2010 | Amano | G06F 3/1438 715/859 |
| 2010/0199208 | A1 * | 8/2010 | Tokunaga | G06F 3/03549 715/777 |
| 2010/0257482 | A1 * | 10/2010 | Lyons | G06F 3/0486 715/794 |
| 2011/0061020 | A1 * | 3/2011 | Yoo | H04N 21/4438 715/790 |
| 2011/0138314 | A1 * | 6/2011 | Mir | G06F 9/452 715/779 |
| 2011/0214063 | A1 * | 9/2011 | Saul | G06F 3/04886 715/740 |
| 2012/0131625 | A1 * | 5/2012 | Satheesh | H04N 21/4312 725/109 |
| 2012/0185805 | A1 | 7/2012 | Louch et al. | |
| 2012/0236035 | A1 * | 9/2012 | Kimura | H04M 1/0247 345/660 |
| 2012/0327104 | A1 * | 12/2012 | Schrauben | G01C 23/00 345/619 |
| 2013/0145295 | A1 * | 6/2013 | Bocking | G06F 3/0481 715/764 |
| 2013/0227472 | A1 * | 8/2013 | Sosinski | G06F 3/04883 715/794 |
| 2014/0282229 | A1 * | 9/2014 | Laukkanen | G06F 3/04842 715/788 |

FOREIGN PATENT DOCUMENTS

| | | |
|---|---|---|
| EP | 2104342 A2 | 9/2009 |
| JP | 8123649 A | 5/1996 |
| JP | 2000099238 A | 4/2000 |
| JP | 2000209520 A | 7/2000 |
| JP | 2001134378 A | 5/2001 |
| JP | 2002323968 A | 11/2002 |

OTHER PUBLICATIONS

MetaFilter, How can I see on my main monitor what is being displayed on my secondary monitor?, https://ask.metafilter.com/201437/How-can-I-see-on-my-main-monitor-what-is-being-displayed-on-my-secondary-monitor (Year: 2011).*

[H]ardForum, Dual Monitor "Picture in picture" of other monitor?, https://hardforum.com/threads/dual-monitor-picture-in-picture-of-other-monitor.1321096/ (Year: 2008).*

Extended European Search Report dated Oct. 29, 2015, including a Supplementary European Search Report and the European Search Opinion, in connection with EP Application No. 13833901.5 (7 pgs.).

International Search Report dated Jul. 30, 2013 from corresponding International Application No. PCT/JP2013/063144; 2 pgs.

Japanese Office Action dated Sep. 25, 2014 from corresponding Japanese Application No. 2013-539077; 6 pgs.

Australian Office Action dated Nov. 15, 2016, in connection with corresponding AU Application No. 2013310588 (5 pgs.).

European Office Action dated Dec. 12, 2017, in connection with corresponding EP Application No. 13 833 901.5 (7 pgs.).

Chinese Office Action dated Aug. 2, 2018, in connection with corresponding CN Application No. 201380044816.8 (9 pgs., including English translation).

European Summons to attend oral proceedings pursuant to Rule 115(1) EPC dated Jan. 7, 2019, in connection with corresponding EP Application No. 13833901.5 (12 pgs.).

Marco Chiappetta, "Flow to set up multiple monitors in Windows 8", PCWorld, Jul. 29, 2012, XP055090791, retrieved from the Internet URL: http://www.pcworld.com/article/259794/how_to_set_up_multiple-monitors_in_windows_8.html, retrieved on Nov. 28, 2013.

(56) References Cited

OTHER PUBLICATIONS

Indian Office Action dated Dec. 23, 2019, in connection with corresponding IN Application No. 2507/DELNP/2015 (7 pgs.).

* cited by examiner

A

B

POINTER POSITION MOVES
FROM AREA a TO AREA b

DISPLAY AREA B IS
DISPLAYED SIMULTANEOUSLY
WITH DISPLAY AREA A

A

B

POINTER POSITION MOVES
FROM AREA b TO AREA a

DISPLAY AREA B IS HIDDEN

A DISPLAY PROPERTIES

B DISPLAY PROPERTIES

C DISPLAY PROPERTIES

A

B

C

A

DISPLAY PROPERTIES

DISPLAY SCREEN

B

DISPLAY PROPERTIES

DISPLAY SCREEN

C

DISPLAY PROPERTIES

DISPLAY SCREEN

A
DISPLAY PROPERTIES

DISPLAY SCREEN

B
DISPLAY PROPERTIES

DISPLAY SCREEN

C
DISPLAY PROPERTIES

DISPLAY SCREEN

A DISPLAY PROPERTIES

DISPLAY SCREEN

B DISPLAY PROPERTIES

DISPLAY SCREEN

C DISPLAY PROPERTIES

DISPLAY SCREEN

MANAGEMENT OF MULTIPLE DISPLAY AREAS

TECHNICAL FIELD

The present invention relates to a display control method of positioning a plurality of areas in a working area in which a pointer can move and displaying, on a display screen, at least one of a plurality of display areas corresponding to the plurality of areas in accordance with a movement of the pointer and a computer program, display control device, and image display system for performing the display control method.

BACKGROUND ART

Traditionally, a high-resolution monitor (display device) and a low-resolution monitor are installed at the radiographic interpretation sites of medical institutions such as hospitals and are connected to a single image generation device to use a multi-monitor function; X-ray images, CT-scan images, or the like are displayed on the high-resolution monitor; and operation images (console images) for operating the images are displayed on the low-resolution monitor.

FIG. 16 is a schematic diagram showing an example configuration of a traditional image display system. As shown in FIG. 16, two display devices, a display device 301 having a high-resolution display area A and a display device 302 having a low-resolution display area B, are connected to an image generation device 300 (multi-monitor setup).

However, installation of multiple display devices imposes installation work or maintenance work on the user, and it is desirable to display two screens on a single display device. For this reason, there have been disclosed technologies of switching between two screens on a single display device by determining the moving position of a pointer (see Patent Literature 1).

PRIOR ART LITERATURE

Patent Literature

Patent Literature 1: Japanese Unexamined Patent Application Publication No. 2000-99238

SUMMARY OF THE INVENTION

Problems to be Solved by the Invention

However, the technology of Patent Literature 1 displays only one screen on a display device and therefore the user cannot see both screens simultaneously.

The present invention has been made in view of the foregoing, and an object thereof is to provide a display control method by which the user can cause, with enhanced ease of use, a single display device to display multiple screens and a computer program, display control device, and image display system for performing the display control method.

Means For Solving the Problems

A first aspect of the present invention provides a display control method of positioning a plurality of areas in a working area in which a pointer can move and displaying, on a display screen, at least one of a plurality of display areas corresponding to the plurality of areas in accordance with a movement of the pointer. The method comprises:

displaying, on the display screen, one display area corresponding to one of the plurality of areas;

determining whether the pointer has moved from the one area to another area; and if so determined in the determining step, displaying, on the display screen, the one display area as well as another display area corresponding to the other area.

In a second aspect of the present invention, the display control method of the first aspect further comprises:

determining whether after moving to the other area, the pointer has moved back to the one area; and if so determined in the determining step, hiding the other display area.

In a third aspect of the present invention, the display control method of the second aspect further comprises displaying, on the display screen, a boundary between the one area and the other area.

According to a fourth aspect of the present invention, in the display control method of the third aspect, displaying the boundary comprises displaying the boundary on the one display area when the other display area is not displayed.

According to a fifth aspect of the present invention, in the display control method of the third aspect, displaying the boundary comprises displaying the boundary on the other display area when the other display area is displayed.

According to a sixth aspect of the present invention, the display control method of any one of the first to fifth aspects further comprises:

setting a positional relationship between the one area and the other area; and determining a display position of the other display area with respect to the one display area on the basis of the positional relationship set in the setting step.

According to a seventh aspect of the present invention, the display control method of any one of the first to sixth aspects further comprises:

calculating a moving distance of the pointer from the one area to the other area; and adjusting a range of the other display area displayed on the display screen in accordance with the moving distance calculated in the calculating step.

A ninth aspect of the present invention provides a computer program for causing a computer to position a plurality of areas in a working area in which a pointer can move and to display, on a display screen, at least one of a plurality of display areas corresponding to the plurality of areas in accordance with a movement of the pointer. The computer program causes the computer to:

display, on the display screen, one display area corresponding to one of the plurality of areas;

determine whether the pointer has moved from the one area to another area; and if so determined, display, on the display screen, the one display area as well as another display area corresponding to the other area.

A tenth aspect of the present invention provides a display control device that positions a plurality of areas in a working area in which a pointer can move and displays, on a display screen, at least one of a plurality of display areas corresponding to the plurality of areas in accordance with a movement of the pointer. The display control device comprises display control means configured to display, on the display screen, one display area corresponding to one of the plurality of areas, wherein when the pointer moves from the one area to another area, the display control means displays, on the display screen, the one display area as well as another display area corresponding to the other area.

According to an eleventh aspect of the present invention, an image display system comprises:

the display control device of the tenth aspect; and an image display device comprising a display screen on which the display control device displays a pointer.

In the first, ninth, tenth, and eleventh aspects of the present invention, the function of simultaneously displaying multiple display areas, for example, a display area A (parent screen) and a display area B (child screen) on the display screen (PinP function) is previously provided. An area in the working area corresponding to the display area A is defined as an area a, and an area in the working area corresponding to the display area B is defined as an area b. The areas a and b are positioned in the working area, for example, in such a manner to be adjacent to each other. The pointer refers to, for example, a figure, character, or symbol for pointing to the target object on the display screen. The user moves the pointer on the display screen using a pointing device such as a mouse or touchpad. The pointer also refers to the pointer in the working area (hereafter also referred to as the "pointer position").

In these aspects of the present invention, it is determined whether the pointer position has moved from one (e.g., area a) to another (e.g., area b) of the multiple areas. For example, when the pointer is moved in the display area A, the pointer position moves in the area a. When the pointer position is determined to have moved from the one area (area a) to the other area (area b), the one display area, A, corresponding to the area a, and the other display area, B, corresponding to the area b, are simultaneously displayed. Thus, for example, when the pointer is moved in such a manner to cross the boundary of the display area A in the state that only the display area A (parent screen) is displayed, the display area B (child screen) is displayed and the pointer is displayed on the display area B. That is, only by moving the pointer on the display screen, for example, by operating the pointing device, the user can cause the multiple screens to be simultaneously displayed based on the PinP function (can enable the PinP function) and seamlessly switch between the display areas (screens) on which the pointer is displayed. In other words, the user can operate the display device with enhanced ease of use.

In the second aspect of the present invention, it is determined whether after moving to the other area, b, the pointer position has moved back to the one area, a, and if so determined, the displayed other display area, B, is hidden. For example, when the pointer is moved in such a manner to cross the boundary of the display area B in the state that the display area A (parent screen) and display area B (child screen) are displayed, the display area B is hidden and the pointer is displayed on the display area A. That is, only by moving the pointer on the display screen, for example, by operating the pointing device, the user can disable the PinP function and seamlessly switch between the display areas (screens) on which the pointer is displayed. That is, the user can operate the display device with enhanced ease of use.

In the third aspect of the present invention, the boundary between the one area, a, and the other area, b, is displayed on the display screen. The length of this boundary represents the adjacent range in which the areas a and b are adjacent to each other. For example, when the areas a and b are positioned in such a manner that a part of the right side of the area a and the left side of the area b are adjacent to each other, the pointer position can move between the areas a and b in the adjacent range and cannot move from the area a to the area b in the non-adjacent range. The display of the adjacent range allows the user to easily understand in what range on the display screen he or she can move the pointer to enable or disable the PinP function. That is, the user can operate the display device with enhanced ease of use.

In the fourth aspect of the present invention, when the other display area, B, is not displayed, the boundary (adjacent range) is displayed on the one display area, A. That is, when the PinP function is disabled and only the display area A (parent screen) is displayed on the display screen, the user only moves the pointer to the adjacent range and then moves it out of the display area A to enable the PinP function and display the display area B (child screen). That is, the user can operate the display device with enhanced ease of use.

In the fifth aspect of the present invention, when the other display area, B, is displayed, the boundary (adjacent range) is displayed on the display area B. That is, when the PinP function is enabled and the display area A (parent screen) and display area B (child screen) are simultaneously displayed on the display screen, the user only moves the pointer on the display area B to the adjacent range and then to the display area A to disable the PinP function and hide the display area B. That is, the user can operate the display device with enhanced ease of use.

In the sixth aspect of the present invention, the positional relationship between the one area, a, and the other area, b, is set, and the display position of the other display area, B, with respect to the one display area, A, is determined based on the set positional relationship. For example, the area b is positioned adjacent to the upper, lower, left, or right side of the area a in the working area. The positioning of the areas in the working area can be performed, for example, using a function (e.g., Display Properties/Settings) of a program (e.g., operating system) supporting a multi-display (multi-monitor) having the PinP function. Subsequently, the display position of the display area B with respect to the display area A is determined in accordance with the position of the area b with respect to the area a in the working area. As a result, the display area B is displayed on an upper, lower, left, or right portion of the display area A.

For example, assume that the area b is positioned adjacent to the right side of the area a in the working area and that only the display area A is displayed on the display screen. Then, as the user moves the pointer to the right on the display area A, the pointer position moves to the right on the area a. When the pointer position crosses the boundary of the area a and enters the area b, the display area B is displayed on a right portion of the display area A, and the pointer is displayed on the display area B. Thus, the user can easily recognize the movement of the pointer without losing sight of the pointer on the display screen. Similarly, assume that the area b is positioned adjacent to the left side of the area a in the working area and that only the display area A is displayed on the display screen. Then, as the user moves the pointer to the left on the display area A, the pointer position moves to the left on the area a. When the pointer position crosses the boundary of the area a and enters the area b, the display area B is displayed on a left portion of the display area A, and the pointer is displayed on the display area B. Thus, the user can easily recognize the movement of the pointer without losing sight of the pointer on the display screen. The same goes for when the area b is positioned adjacent to the upper or lower side of the area a.

In the seventh aspect of the present invention, the moving distance of the pointer position from the one area, a, to the other area, b, is calculated. The moving distance may be the distance from the boundary between the areas a and b to the pointer position in the area b. The range of the other display area, B, (child screen) displayed on the display screen is adjusted in accordance with the calculated moving distance. For example, the display area B is displayed in such a manner to gradually expand from the boundary of the display area A in accordance with the calculated moving distance. Thus, the pointer stays in approximately the same position on the display screen regardless of the moving distance of the pointer position. Accordingly, the user is prevented from losing sight of the pointer and can perform an intuitive operation.

In the eighth aspect of the present invention, the image quality of at least one of the one display area, A, and the other display area, B, is controlled. By making a difference in image quality between the display areas, the display areas are clearly distinguished from each other when the display areas are simultaneously displayed (PinP function is enabled). Thus, the user can operate the display device without being puzzled by the simultaneous display. Further, by controlling the image quality of the display areas in accordance with the display images thereon, the images can always be optimally displayed on the display areas.

Effect of the Invention

According to the present invention, the user can operate the display device with enhanced ease of use.

EMBODIMENTS

Figure 1:
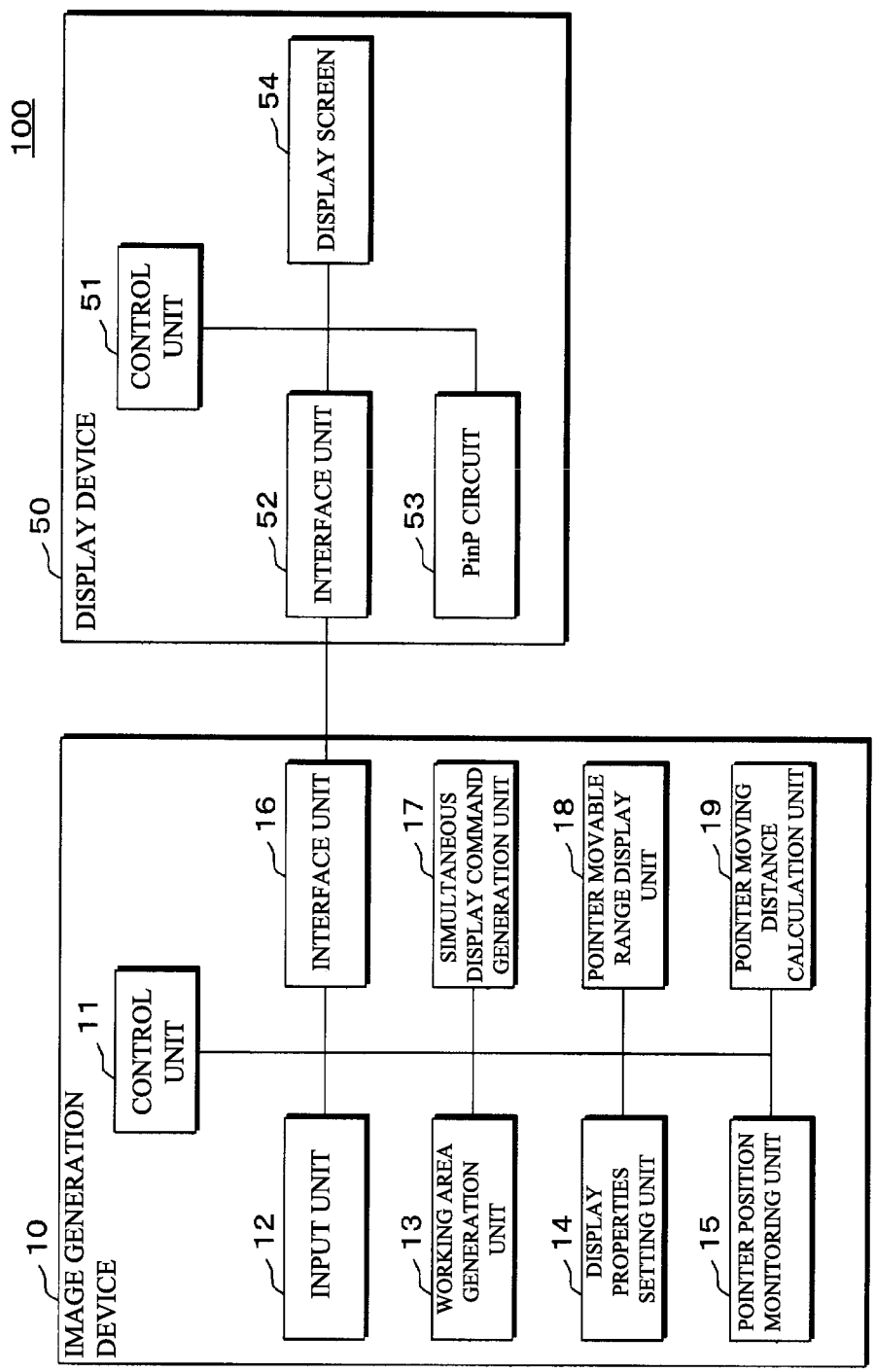
FIG. 1 is a block diagram showing an example configuration of an image display system of the present embodiment.

Now, an embodiment of a display control method, a computer program, a display control device, and an image display system of the present invention will be described with reference to the drawings. FIG. 1 is a block diagram showing an example configuration of an image display system 100 of the present embodiment. The image display system 100 includes an image generation device 10 serving as a display control device and a display device 50 serving as an image display device. The display device 50 displays images when the image generation device 10 outputs, to the display device 50, image data generated thereby or image data captured from an external device.

The image generation device 10 includes a control unit 11 configured to control the entire device, an input unit 12, a working area generation unit 13, a display properties setting unit 14, a pointer position monitoring unit 15, an interface unit 16, a simultaneous display command generation unit 17, a pointer movable range display unit 18, and a pointer moving distance calculation unit 19.

The display device 50 includes a control unit 51 configured to control the entire device, an interface unit 52, a PinP circuit 53, and a display screen 54.

The interface unit 52 sends or receives information, such as image data or command, to or from the interface unit 16 of the image generation device 10. Typically, the interface unit 52 includes USB/video cables and transceivers for sending or receiving sets of information, such as image data or commands, corresponding to multiple display areas.

The PinP circuit 53 performs the function of simultaneously displaying multiple display areas (e.g., a parent screen, a child screen) on the display screen 54, that is, the picture-in-picture (PinP) function. The PinP circuit 53 switches between enable and disable of the PinP function in accordance with a command (PinP function enable command, PinP function disable command, or the like) outputted from the image generation device 10 (simultaneous display command generation unit 17).

When the PinP function is enabled, the PinP circuit 53 displays a display area B in a display area A on the display screen 54 on the basis of position information outputted from the image generation device 10. Details of the position information will be described later.

When the PinP function is enabled, multiple display areas are simultaneously displayed on the display screen 54; when the PinP function is disabled, only one display area (parent screen) is displayed, that is, the multiple display areas are not simultaneously displayed. In the following description, the phrase "simultaneously displayed" also means that a state in which multiple display areas are simultaneously displayed is maintained. The phrase "simultaneously displayed" includes a state in which multiple display areas are displayed in such a manner that other display areas are superimposed on one display area, as well as a state in which two or more display areas are displayed in such a manner to be arranged side-by-side without overlapping each other, that is, in a picture-by-picture (PbyP) manner. Described below as an example of "simultaneously displayed" is a case in which multiple display areas are displayed in a superimposed manner.

Figure 2:
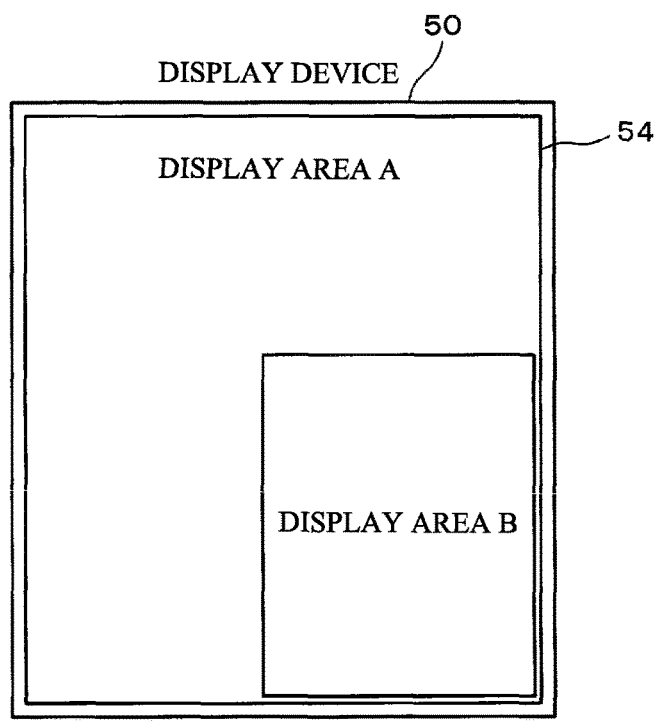
FIG. 2 is a schematic diagram showing an example of a display screen when the PinP function is enabled.

FIG. 2 is a schematic diagram showing an example of the display screen 54 when the PinP function is enabled. As shown in FIG. 2, another display area (child screen), B, is superimposed on one display area (parent screen), A, on the display screen 54 of the display device 50. For example, high-resolution images such as X-ray images or CT-scan images may be displayed on the display area A, while relatively-low-resolution operation images (console images) may be displayed on the display area B. Note that the position of the display area B with respect to the display area A shown in FIG. 2 is illustrative only and is not limiting. While the single display area B is superimposed in the example of FIG. 2, two or more display areas may be superimposed. When the PinP function is disabled, for example, only the display area A (parent screen) is displayed.

Next, the image generation device 10 will be described.

The input unit 12 includes, for example, a pointing device such as a mouse or touchpad and has a function of, when the user moves the pointer to the target object on the display screen 54, receiving the movement. The pointer refers to, for example, a figure, character, symbol, pattern, or the like for pointing to the target object on the display screen 54.

The working area generation unit 13 generates multiple areas in a memory stored in the image generation device 10 corresponding to multiple display areas displayed on the display screen 54 and positions the areas in a single working area. Note that the working area generation unit 13 generates multiple areas, whether the PinP function is enabled or disabled. For example, when the multiple display areas are display areas A and B as shown in FIG. 2, the working area generation unit 13 defines an area in the working area corresponding to the display area A as an area a, defines an area in the working area corresponding to the display area B as an area b, and positions the areas a and b in the working area. The areas a and b are positioned in the working area, for example, in such a manner to be adjacent to each other.

In the working area, the pointer can be moved in accordance with an operation of the pointing device. That is, in the present embodiment, the "pointer" refers to the pointer displayed on the display screen, as well as the pointer in the working area. The pointer in the working area is also referred to as the "pointer position".

The display properties setting unit 14 sets the positions of the areas in the working area. For example, the display properties setting unit 14 defines the display area A as a parent screen (a screen displayed when the PinP function is disabled) and defines the display area B as a child screen (a screen displayed simultaneously with the parent screen when the PinP function is enabled). The display properties setting unit 14 also defines areas in the working area corresponding to the display areas A and B as areas a and b, respectively. The display properties setting unit 14 then makes settings so that the area b corresponding to the child screen is positioned adjacent to the upper, lower, left, or right side of the area a corresponding to the parent screen.

The function of the display properties setting unit 14, that is, the positioning of the areas in the working area can be performed, for example, using a function of a program (e.g., operating system) supporting a multi-display (multi-monitor) having the PinP function.

Figure 3:
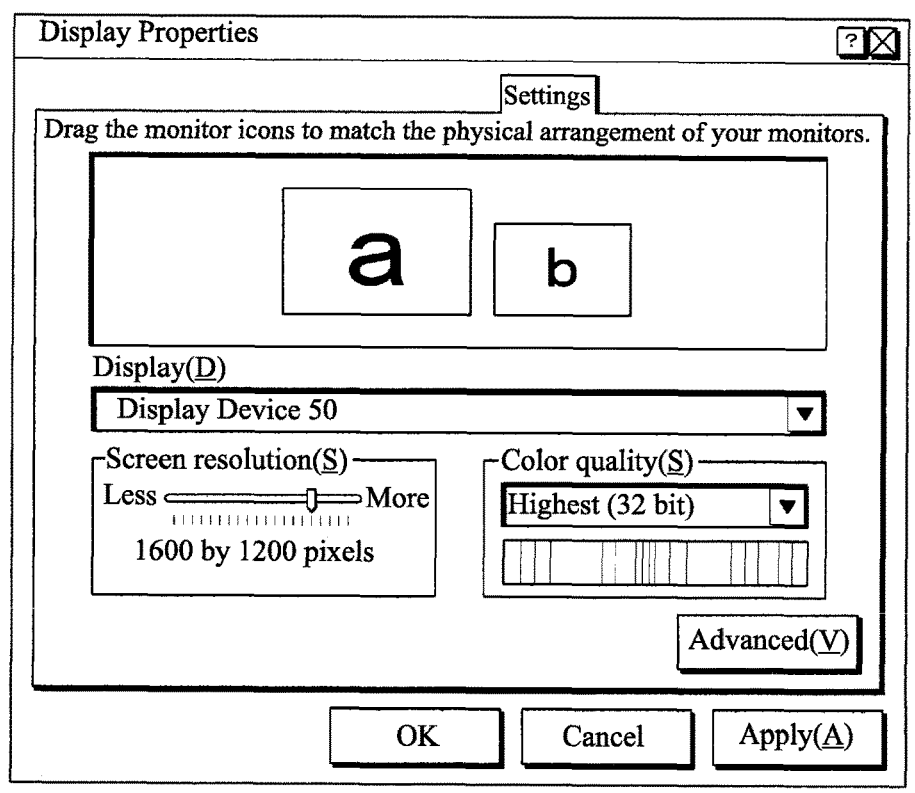
FIG. 3 is a schematic diagram showing an example of a Display Properties/Settings window.

FIG. 3 is a schematic diagram showing an example of a Display Properties/Settings window. The user can display the Display Properties/Settings window shown in FIG. 3 on the display screen 54 and position the area b in a desired position via the input unit 12. Upon receipt of the positioning operation by the user, the display properties setting unit 14 sets the positions of the areas a and b, and generates position information of the display areas A and B corresponding to the areas a and b.

Figure 4:
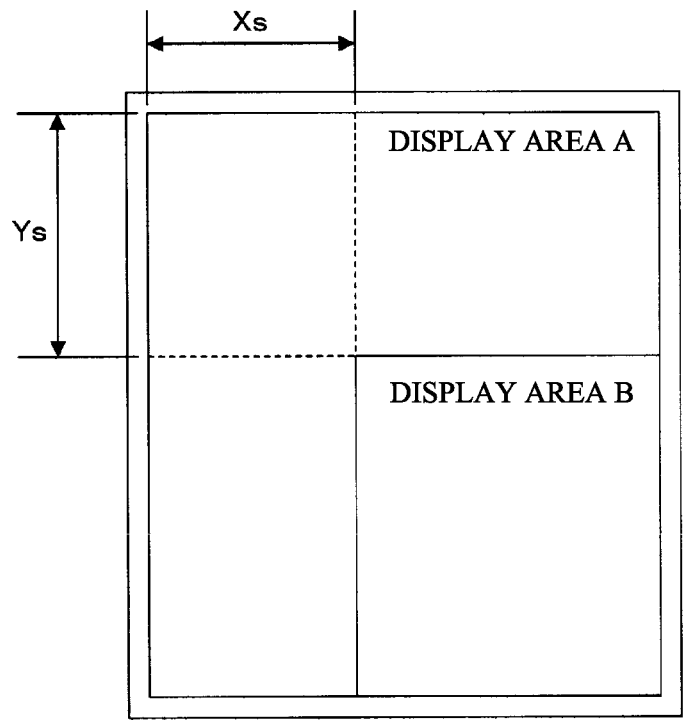
FIG. 4 is a diagram showing an example of position information.

FIG. 4 is a diagram showing an example of the position information. As shown in FIG. 4, the position information indicates where the origin of the display area B is positioned with respect to the origin of the display area A (e.g., the upper-left corner of the display area A) or coordinates (0, 0) and can be represented, for example, by coordinates (Xs, Ys). Note that the origin of the display area B may be the upper-right, lower-right, or lower-left corner thereof in place of the upper-left corner thereof in accordance with the position of the display area B in the display area A.

The position information is not limited to the coordinates of the origin of the display area B with respect to the display area A and may be, for example, the coordinates of the four corners of the display area B, or it may include other detailed information. The image generation device 10 may output the position information to the display device 50 each time the PinP function is enabled and thus the child screen is displayed, or each time the settings of the display properties are changed.

The PinP circuit of the display device 50 analyzes the position information to determine the display position of the child screen. As an alternative, the image generation device 10 may analyze the position information and output the analysis result (the display position of the child screen) to the display device 50. As another alternative, the display device 50 may acquire the positions of the areas a and b from the image generation device 10 and then generate position information. If any of the parent screen and child screen is scaled up or down in the display device 50, position information is generated considering the scale-up or scale-down rate. Yet another alternative may be to previously determine display position options (e.g., four positions: upper-right, lower-right, upper-left, and lower-left positions) of the child screen and to select one from the display position options on the basis of the positions of the areas a and b. In this case, there is no need to generate position information.

Figure 5:
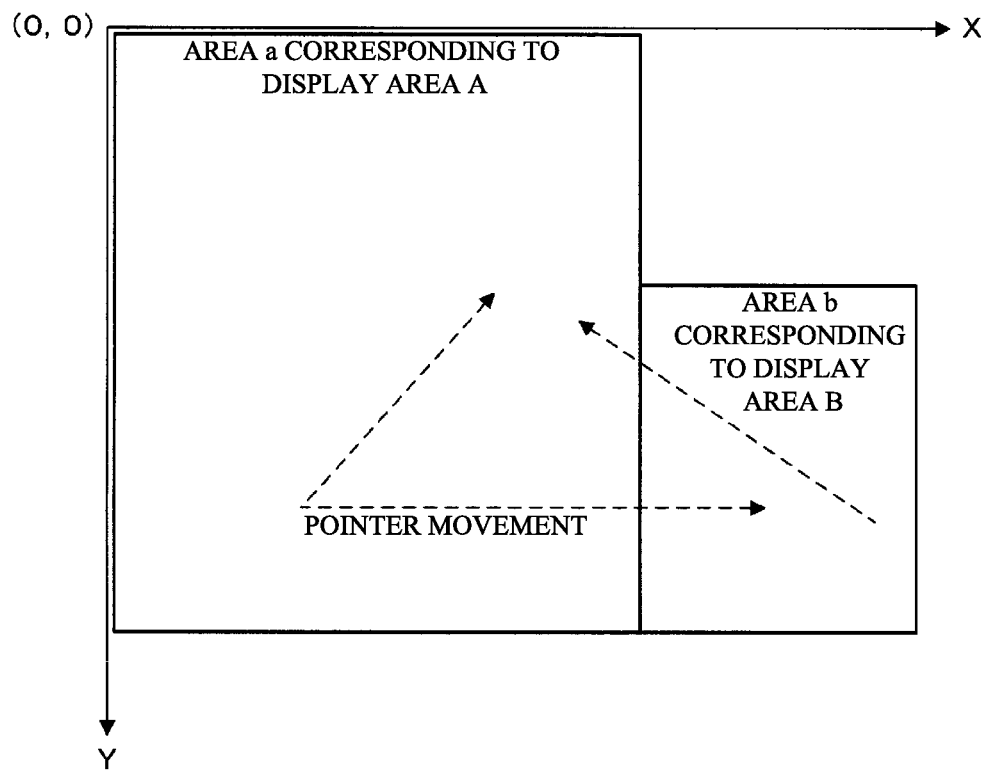
FIG. 5 is a diagram showing an example of the manner in which the pointer position moves in the working area.

FIG. 5 is a diagram showing an example of the manner in which the pointer position moves in the working area. When the user moves the pointer on the display screen 54, the pointer position in the working area moves in accordance with the moving operation.

For example, when only the display area A (parent screen) is displayed on the display screen 54 (when the PinP function is disabled), the pointer position moves in the area a. In contrast, when the display area A (parent screen) and display area B (child screen) are simultaneously displayed on the display screen 54 (when the PinP function is enabled), the pointer position moves in the area b.

When only the display area A (parent screen) is displayed on the display screen 54 (when the PinP function is disabled), the pointer position monitoring unit 15 determines whether the pointer position has moved from the area a to the area b and outputs the determination to the simultaneous display command generation unit 17.

In contrast, when the display area A (parent screen) and display area B (child screen) are simultaneously displayed on the display screen 54 (when the PinP function is enabled), the pointer position monitoring unit 15 determines whether the pointer position has moved from the area b to the area a and outputs the determination to the simultaneous display command generation unit 17.

When the determination is that the pointer position has moved from the area a to the area b, the simultaneous display command generation unit 17 outputs a PinP function enable command to the display device 50.

In contrast, when the determination is that the pointer position has moved from the area b to the area a, the simultaneous display command generation unit 17 outputs a PinP function disable command to the display device 50.

Figure 6:
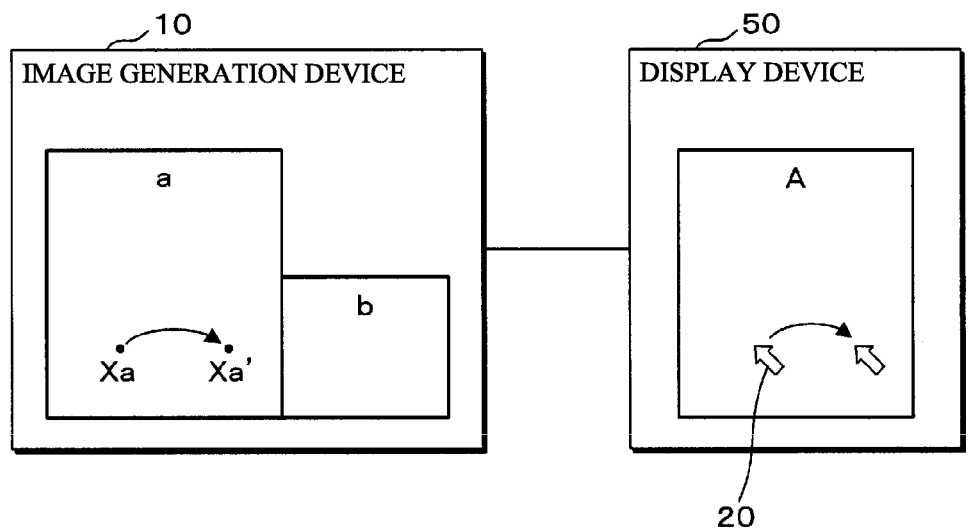
FIGS. 6A and 6B are diagrams showing an example of the manner in which the PinP function is enabled based on a movement of the pointer.
Figure 6:
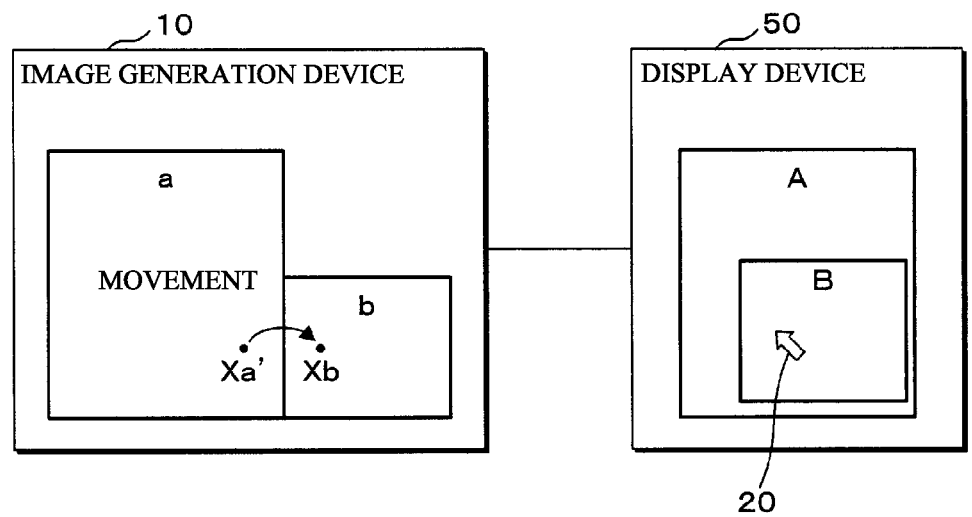

FIGS. 6A and 6B are diagrams showing an example of the manner in which the PinP function is enabled based on a movement of the pointer. FIG. 6A shows when the PinP function is disabled, and FIG. 6B shows when the PinP function is enabled. As shown in FIG. 6A, when the PinP function is disabled, only the display area A (parent screen) is displayed, and the pointer position in the working area moves, for example, from Xa to Xa' in the area a, which corresponds to the display area A, in accordance with a movement of a pointer 20.

Subsequently, as shown in FIG. 6B, when the pointer position moves from Xa' in the area a to Xb in the area b, that is, when the pointer position moves from the area a to the area b, the PinP function is enabled and thus the display area B is displayed simultaneously with the display area A in such a manner to be superimposed on the display area A. The pointer 20 is displayed on the display area B, which corresponds to the area b.

As seen above, when the user moves the pointer in such a manner that the pointer crosses the boundary of the display area A in the state that only the display area A (parent screen) is displayed, the display area B (child screen) is displayed and the pointer is displayed on the display area B. That is, only by moving the pointer on the display screen, for example, by operating the pointing device, the user can cause multiple screens to be simultaneously displayed based on the PinP function (i.e., can enable the PinP function) and seamlessly switch between the display areas (screens) on which the pointer is displayed. In other words, the user can operate the display device with enhanced ease of use.

Figure 7:
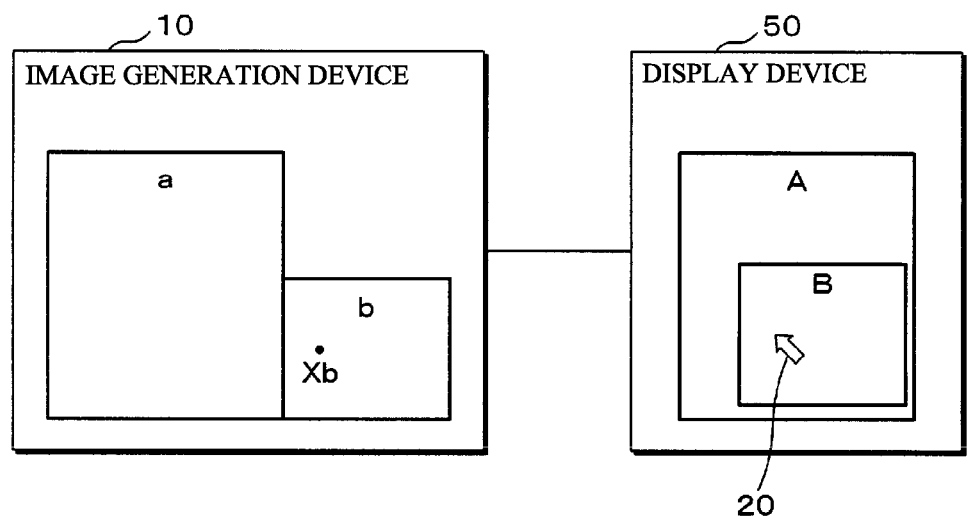
FIGS. 7A and 7B are diagram showing an example of the manner in which the PinP function is disabled based on a movement of the pointer.
Figure 7:
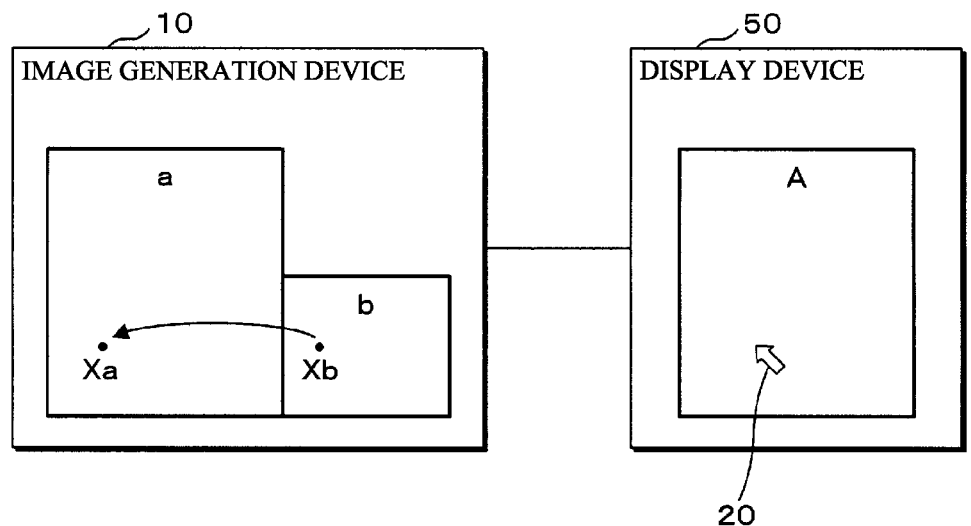

FIGS. 7A and 7B are diagrams showing an example of the manner in which the PinP function is disabled based on a movement of the pointer. FIG. 7A shows when the PinP function is enabled, and FIG. 7B shows when the PinP function is disabled. As shown in FIG. 7A, when the PinP function is enabled, the display area A (parent screen) and display area B (child screen) are displayed. The pointer position in the working area is located at, for example, Xb in the area b, which corresponds to the display area B, in accordance with a movement of the pointer 20.

Subsequently, as shown in FIG. 7B, when the pointer position moves from Xb in the area b to Xa in the area a, that is, when the pointer position moves from the area b to the area a, the PinP function is disabled and thus the display area B, which has been displayed in such a manner to be superimposed on the display area A, is hidden. The pointer 20 is displayed on the display area A, which corresponds to the area a.

As seen above, when the user moves the pointer in such a manner that the pointer crosses the boundary of the display area B in the state that the display area A (parent screen) and display area B (child screen) are displayed, the display area B (child screen) is hidden and the pointer is displayed on the display area A. That is, only by moving the pointer on the display screen, for example, by operating the pointing device, the user can disable the PinP function and seamlessly switch between the display areas (screens) on which the pointer is displayed. In other words, the user can operate the display device with enhanced ease of use.

Use of shortcut keys of the keyboard or a specific key operation is a possible method for switching between the screens. However, when the display areas (parent screen and child screen) are displayed in a superimposed manner, the pointer may disappear if it lies in the display area hidden by the child screen. Thus, the user may lose sight of the pointer, resulting in a reduction in ease of use. In the present embodiment, on the other hand, only by moving the pointer on the display screen using the mouse or the like, the user can display or hide the child screen. Thus, the user is prevented from losing sight of the pointer and do not have to operate particular keys in addition to the mouse. That is, the user can operate an operation with significantly increased ease of use.

Figure 8:
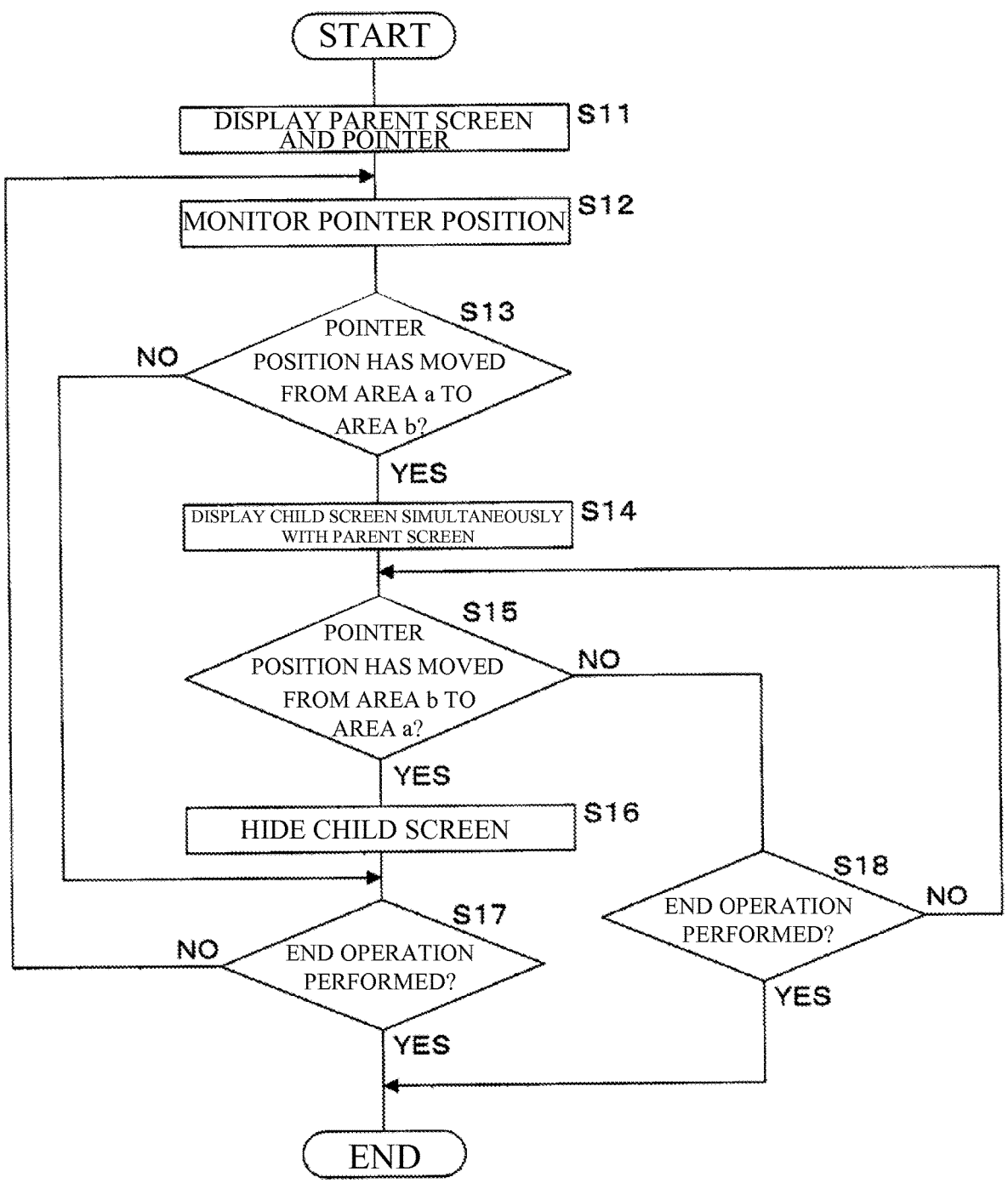
FIG. 8 is a flowchart showing an example of a process performed by an image generation device of the present embodiment.
Figure 9:
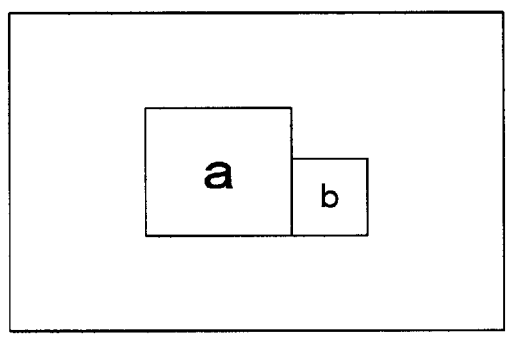
FIGS. 9A to 9C are diagrams each showing the positions of areas and the positional relationship between display areas.
Figure 9:
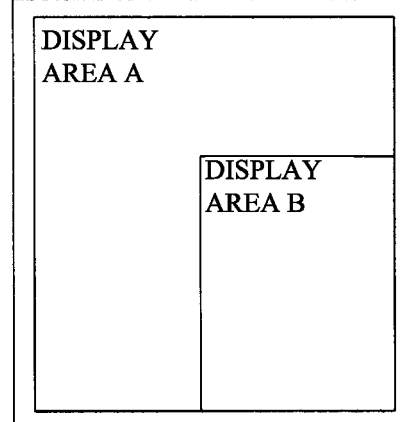
Figure 9:
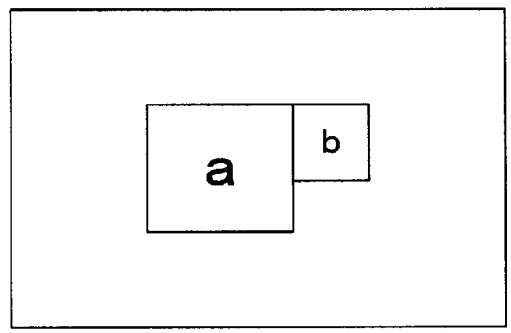
Figure 9:
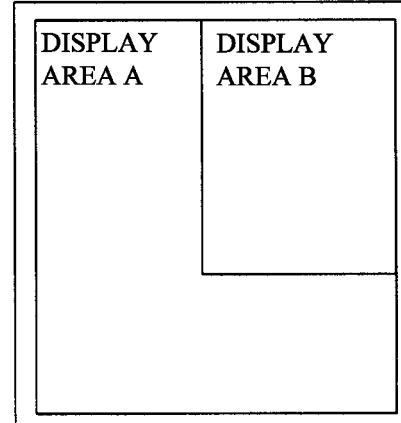
Figure 9:
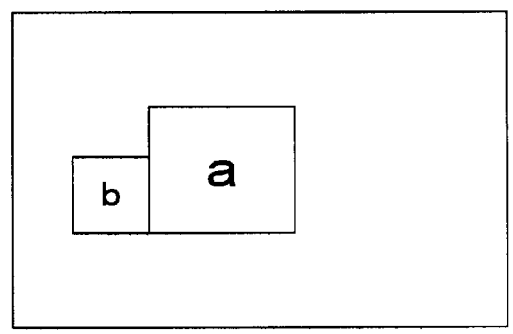
Figure 9:
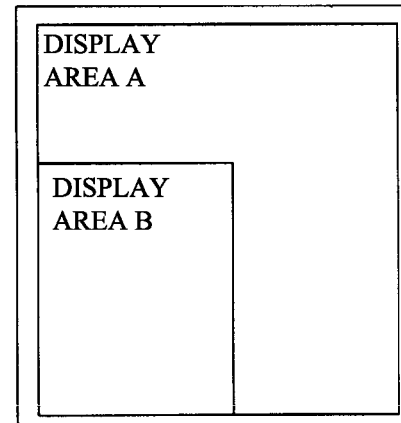
Figure 10:
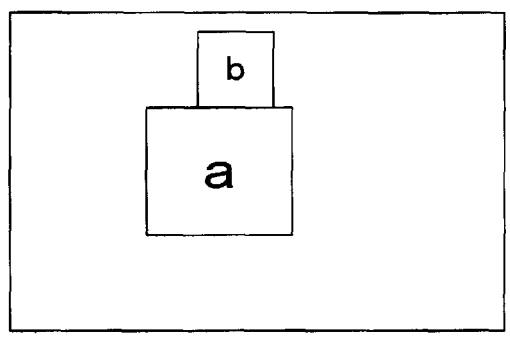
FIGS. 10A to 10C are diagrams each showing the positions of areas and the positional relationship between display areas.
Figure 10:
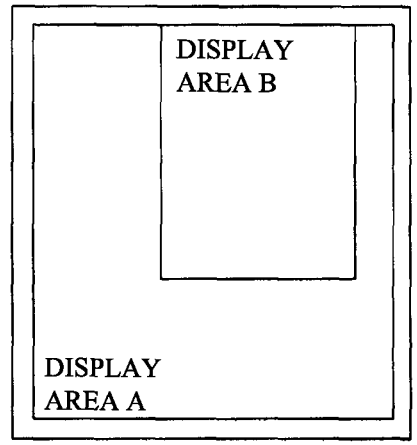
Figure 10:
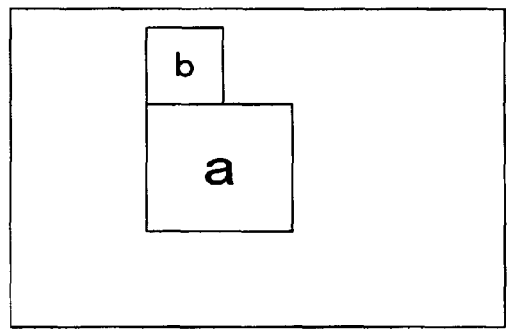
Figure 10:
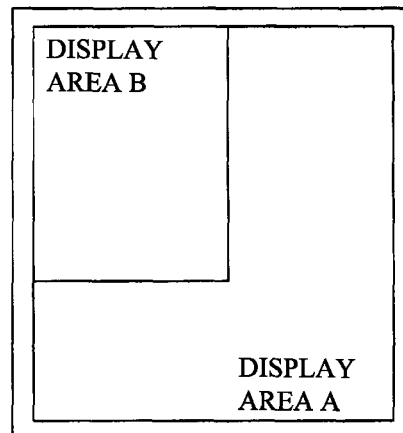
Figure 10:
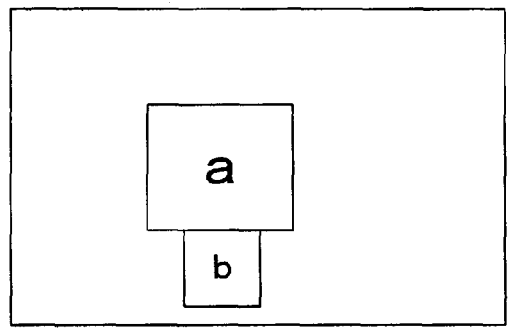
Figure 10:
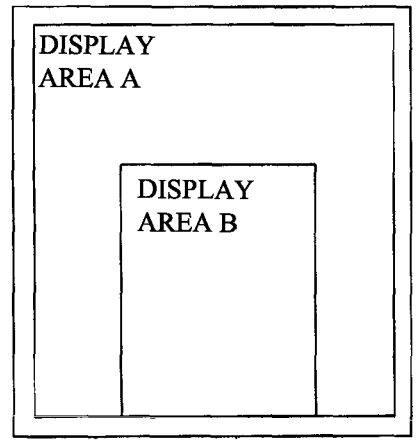

Next, the operation of the image generation device 10 of the present embodiment will be described. FIG. 8 is a flowchart showing an example of a process performed by the image generation device 10 of the present embodiment. The process shown in FIG. 8 can be performed by recording, in a recording medium, a computer program for executing the process, loading the recorded computer program into the RAM of a computer using the recording medium reader of the computer, and causing the CPU of the computer to execute the computer program. In the following description, it is assumed that the control unit 11 performs the process, for the sake of convenience.

The control unit 11 displays the parent screen (display area A) and the pointer on the display screen 54 (S11) and monitors the pointer position in the working area (S12). The control unit 11 then determines whether the pointer position has moved from the area a to the area b (S13) and, if so determined (YES in S13), enables the PinP function to display the child screen (display area B) simultaneously with the parent screen (S14).

The control unit 11 then determines whether the pointer position has moved from the area b to the area a (S15), if so determined (YES in S15), disables the PinP function to hide the child screen (display area B) (S16), and determines whether an end operation has been performed (S17).

If not so determined (NO in S17), the control unit 11 repeats steps S12 and later; if so determined (YES in S17), it ends the process.

If the pointer position has not moved from the area a to the area b (NO in S13), the control unit 11 performs step S17.

If the pointer position has not moved from the area b to the area a (NO in S15), the control unit 11 determines whether an end operation has been performed (S18). If not so determined (NO in S18), the control unit 11 repeats steps S15 and later; if so determined (YES in S18), it ends the process.

In the above example, as shown in FIG. 3, the areas a and b are positioned in such a manner that the area b is positioned adjacent to the right side of the area a. More specifically, the areas a and b are positioned in such a manner that a lower portion of the right side of the area a and the left side of the area b are adjacent to each other. Thus, when the PinP function is enabled, the display area A (parent screen) and display area B (child screen) are displayed in such a manner that the display area B is superimposed on a right portion of the display area A. However, the positions of the areas and the positional relationship between the parent screen and child screen are not limited to those described above. Other example positions will be described below.

FIGS. 9A to 10C are diagrams each showing the positions of the areas and the positional relationship between the display areas. The left diagrams of FIGS. 9A to 10C show the aspect of the display properties, that is, example positions of the areas a and b set on the Display Properties/Settings window shown in FIG. 3 (i.e., example positions of the areas in the working area). The rights diagrams thereof show the display positions of the display areas A and B when the PinP function is enabled.

FIG. 9A is similar to the above example and shows a case where the areas a and b are positioned in such a manner that a lower portion of the right side of the area a and the left side of the area b are adjacent to each other. Thus, when the PinP function is enabled, the display areas A (parent screen) and B (child screen) are displayed in such a manner that the display area B is superimposed on a lower-right portion of the display area A. The areas a and b are positioned in such a manner that the lower sides thereof are aligned with each other.

FIG. 9B shows a case where the areas a and b are positioned in such a manner that an upper portion of the right side of the area a and the left side of the area b are adjacent to each other. Thus, when the PinP function is enabled, the display areas A (parent screen) and B (child screen) are displayed in such a manner that the display area B is superimposed on an upper-right portion of the display area A. The areas a and b are positioned in such a manner that the upper sides thereof are aligned with each other.

In the examples of FIGS. 9A and 9B, when the user moves the pointer position in the area a to the right so that the pointer position moves from the area a to the area b, the display area B is displayed on the lower or upper-right portion of the display area A. That is, the display area B (child screen) is displayed around the position (area) which the pointer, whose movement has been kept sight of by the user, has reached. Thus, the user can easily continue to recognize the pointer without losing sight of it, that is, the user can operate the display device with enhanced ease of use.

FIG. 9C shows a case where the areas a and b are positioned in such a manner that a lower portion of the left side of the area a and the right side of the area b are adjacent to each other. Thus, when the PinP function is enabled, the display area A (parent screen) and display area B (child screen) are displayed in such a manner that the display area B is superimposed on the lower-left portion of the display area A. The areas a and b are positioned in such a manner that the lower sides thereof are aligned with each other.

In the example of FIG. 9C, when the user moves the pointer position in the area a to the left so that the pointer position moves from the area a to the area b, the display area B is displayed on the lower-left portion of the display area A. That is, the display area B (child screen) is displayed around the position (area) which the pointer, whose movement has been kept sight of by the user, has reached. Thus, the user can easily continue to recognize the pointer without losing sight of it, that is, the user can operate the display device with enhanced ease of use.

FIG. 10A shows a case where the areas a and b are displayed in such a manner that a right portion of the upper side of the area a and the lower side of the area b are adjacent to each other. Thus, when the PinP function is enabled, the display area A (parent screen) and display area B (child screen) are displayed in such a manner that the display area B is superimposed on the an upper-right portion of the display area A. The areas a and b are positioned in such a manner that the upper side of the area a and the lower side of the area b are aligned with each other.

FIG. 10B shows a case where the areas a and b are displayed in such a manner that a left portion of the upper side of the area a and the lower side of the area b are adjacent to each other. Thus, when the PinP function is enabled, the display area A (parent screen) and display area B (child screen) are displayed in such a manner that the display area B is superimposed on an upper-left portion of the display area A. The areas a and b are positioned in such a manner that the upper side of the area a and the lower side of the area b are aligned with each other.

In the examples of FIGS. 10A and 10B, when the user moves the pointer position upward in the area a so that the pointer position moves from the area a to the area b, the display area B is displayed on the upper-left or right portion of the display area A. That is, the display area B (child screen) is displayed around the position (area) which the pointer, whose movement has been kept sight of by the user, has reached. Thus, the user can easily continue to recognize the pointer without losing sight of it, that is, the user can operate the display device with enhanced ease of use.

FIG. 10C shows a case where the areas a and b are displayed in such a manner that the central portion of the lower side of the area a and the upper side of the area b are adjacent to each other. Thus, when the PinP function is enabled, the display area A (parent screen) and display area B (child screen) are displayed in such a manner that the display area B is superimposed on a lower central portion of the display area A. The areas a and b are positioned in such a manner that the lower side of the area a and the upper side of the area b are aligned with each other.

In the example of FIG. 10C, when the user moves the pointer position downward in the area a so that the pointer position moves from the area a to the area b, the display area B is displayed on the lower central portion of the display area A. That is, the display area B (child screen) is displayed around the position which the pointer, whose movement has been kept sight of by the user, has reached. Thus, the user can easily continue to recognize the pointer without losing sight of it, that is, the user can operate the display device with enhanced ease of use.

The pointer movable range display unit 18 displays the boundary between the area a and the area b on the display screen. The length of this boundary represents the adjacent range in which the areas a and b are adjacent to each other.

Figure 11:
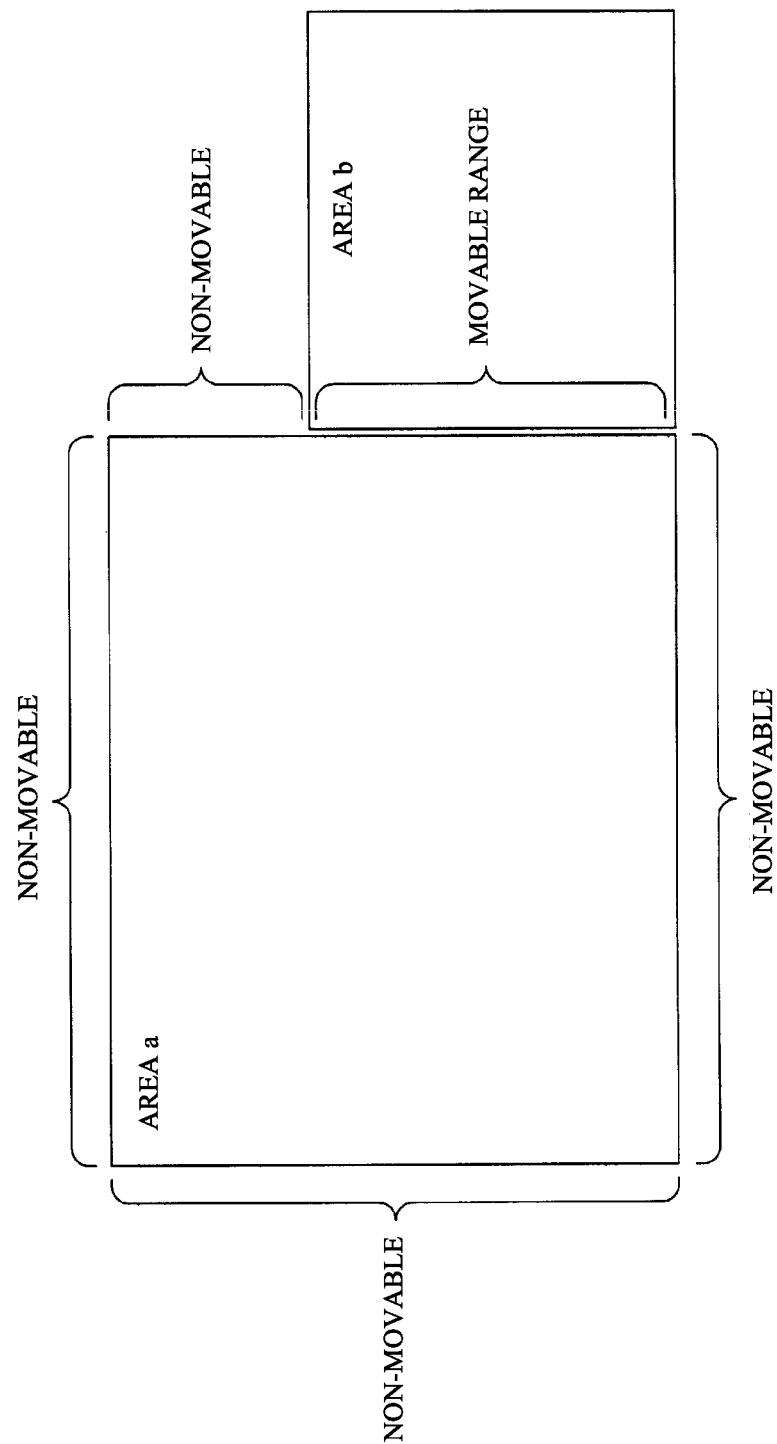
FIG. 11 is a diagram showing an example of the movable range of the pointer position.

FIG. 11 is a diagram showing an example of the movable range of the pointer position. When the areas a and b are positioned in the working area in such a manner that a part of the right side of the area a and the left side of the area b are adjacent to each other, as shown in FIG. 11, the pointer position can freely move between the areas a and b in this adjacent range. On the other hand, the pointer position cannot go out of the area a across the remaining portion of the right side (the portion which is not adjacent to the area b) of the area a and the upper, lower, and left sides of the area a, that is, the pointer is caught by these boundaries. This is because the display area A (parent screen) and display area B (child screen) have different resolutions.

As described above, the adjacent range (boundary) in which the area a and the area b are adjacent to each other is displayed on the display screen. For example, when the areas a and b are positioned in the working area in such a manner that a part of the right side of the area a and the left side of the area b are adjacent to each other, the pointer position can move between the areas a and b in the adjacent range and cannot move from the area a to the area b in the non-adjacent range. The display of the adjacent range allows the user to easily understand in what range on the display screen he or she can move the pointer to enable or disable the PinP function. That is, the user can operate the display device with enhanced ease of use. In an environment in which one of multiple monitors is displayed in a PinP manner, the user may be forced to do the work of memorizing or searching for the position of an area which is invisible to the user, unlike in traditional multi-monitor environments, in which multiple display devices are arranged physically. According to the present configuration, such troublesome work can be eliminated.

Figure 12:
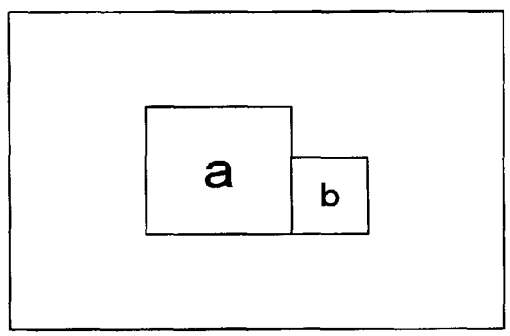
FIGS. 12A to 12C are diagrams each showing a display example of the adjacent range when the PinP function is disabled.
Figure 12:
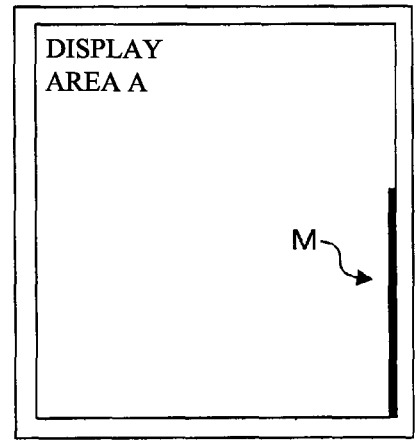
Figure 12:
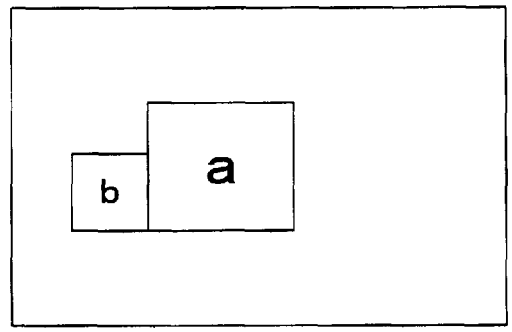
Figure 12:
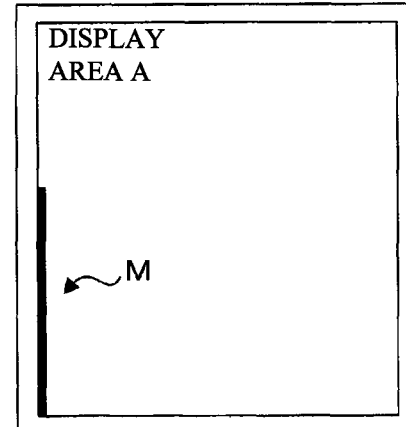
Figure 12:
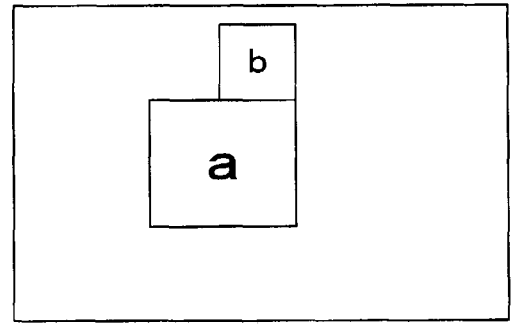
Figure 12:
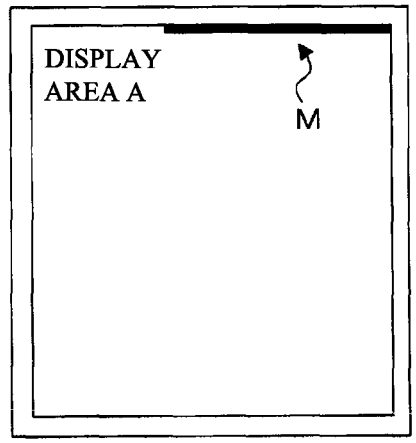

FIGS. 12A to 12C are diagrams each showing a display example of the adjacent range when the PinP function is disabled. The left diagrams of FIGS. 12A to 12C each show the aspect of the display properties, that is, examples of the positions of the areas a and b set on the Display Properties/Settings window shown in FIG. 3; the right diagrams thereof each show the aspect of the display screen.

In FIG. 12A, the areas a and b are positioned in such a manner that a part of the right side of the area a and the left side of the area b are adjacent to each other. Since the pointer position can move between the areas a and b by passing through the adjacent range in which the areas a and b are adjacent to each other, the adjacent range M is displayed on a right edge of the display area A (parent screen). The adjacent range M can be, for example, a belt-shaped mark having a relatively outstanding color, such as red, but it may have any colors, patterns, or shapes as long as it can be recognized by the user.

In FIG. 12B, the areas a and b are positioned in such a manner that a part of the left side of the area a and the right side of the area b are adjacent to each other. Since the pointer position can move between the areas a and b by passing through the adjacent range in which the areas a and b are adjacent to each other, the adjacent range M is displayed on a left edge of the display area A (parent screen).

In FIG. 12C, the areas a and b are positioned in such a manner that a part of the upper side of the area a and the lower side of the area b are adjacent to each other. Since the pointer position can move between the areas a and b by passing through the adjacent range in which the areas a and b are adjacent to each other, the adjacent range M is displayed on an upper edge of the display area A (parent screen).

For FIGS. 12A to 12C, when the user only moves the pointer on the display area A in such a manner that the pointer passes through the adjacent range M, the display area B (child screen) is displayed in such a manner to be superimposed on the display area A (parent screen). That is, when the user wants to display the child screen, he or she only has to move the pointer to the adjacent range M. By doing so, the PinP function can be enabled to display the child screen simultaneously with the parent screen. As seen above, the user can enable the PinP function with an intuitive and simple operation.

As described above, when another display area, B, is not displayed, the boundary (adjacent range M) is displayed on one display area, A. That is, when the PinP function is disabled and only the display area A (parent screen) is displayed on the display screen, the user only moves the pointer to the adjacent range M and moves it out of the display area A to enable the PinP function and display the display area B (child screen). That is, the user can operate the display device with enhanced ease of use.

Figure 13:
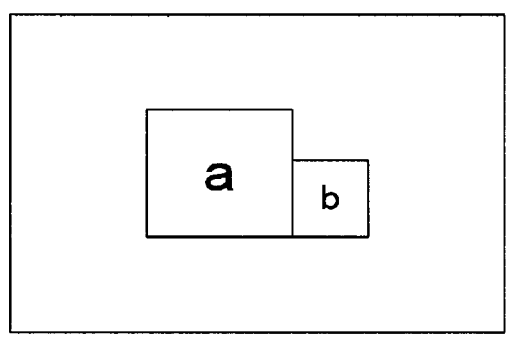
FIGS. 13A to 13C are diagrams each showing a display example of the adjacent range when the PinP function is enabled.
Figure 13:
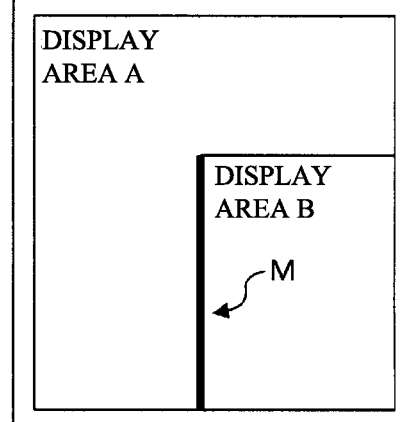
Figure 13:
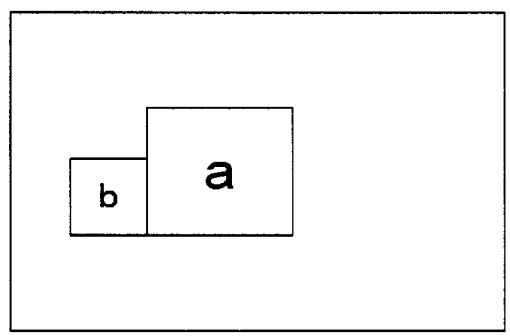
Figure 13:
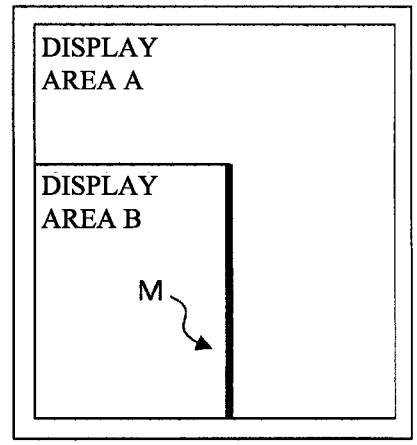
Figure 13:
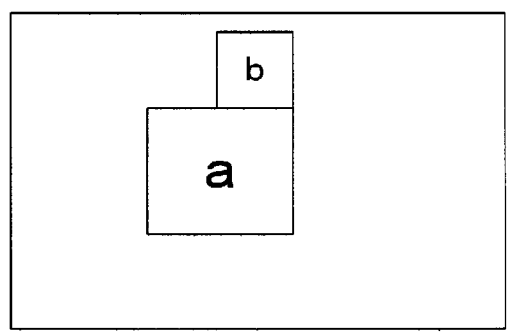
Figure 13:
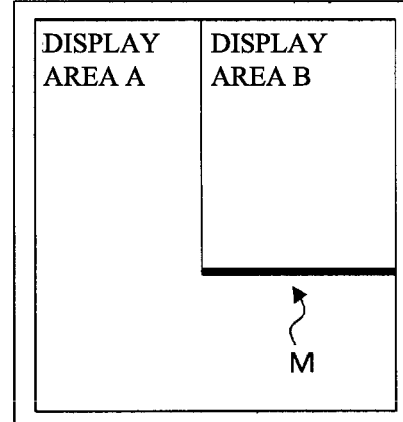

FIGS. 13A to 13C are diagrams each showing a display example of the adjacent range when the PinP function is enabled. The left diagrams of FIGS. 13A to 13C each show the aspect of the display properties, that is, examples of the positions of the areas a and b set on the Display Properties/Settings window shown in FIG. 3, and the right diagrams thereof each show the aspect of the display screen.

In FIG. 13A, the areas a and b are positioned in such a manner that a part of the right side of the area a and the left side of the area b are adjacent to each other. Since the pointer position can move between the areas a and b by passing through the adjacent range in which the areas a and b are adjacent to each other, the adjacent range M is displayed on the left edge of the display area B (child screen).

In FIG. 13B, the areas a and b are positioned in such a manner that a part of the left side of the area a and the right side of the area b are adjacent to each other. Since the pointer position can move between the areas a and b by passing through the adjacent range in which the areas a and b are adjacent to each other, the adjacent range M is displayed on the right edge of the display area B (child screen).

In FIG. 13C, the areas a and b are positioned in such a manner that a part of the upper side of the area a and the lower side of the area b are adjacent to each other. Since the pointer position can move between the areas a and b by passing through the adjacent range in which the areas a and b are adjacent to each other, the adjacent range M is displayed on the lower edge of the display area B (child screen).

For FIGS. 13A to 13C, when the user only moves the pointer on the display area B in such a manner that the pointer passes through the adjacent range M, the display area B (child screen) is hidden. That is, when the user wants to hide the display area B, he or she only has to move the pointer to the adjacent range M. By doing so, the PinP function can be disabled to hide the child screen. As seen above, the user can disable the PinP function with an intuitive and simple operation.

As described above, when another display area, B, is displayed, the boundary (adjacent range M) is displayed on the other display area, B. That is, when the PinP function is enabled and the display area A (parent screen) and display area B (child screen) are displayed on the display screen, the user only moves the pointer on the display area B to the adjacent range M and then to the display area A to disable the PinP function and hide the display area B (child screen). That is, the user can operate the display device with enhanced ease of use.

While the two areas, a and b, are positioned in the above example, multiple areas corresponding to child screens may be positioned. For example, an area a corresponding to a parent screen and areas b and c corresponding to child screens are adjacent to each other in two adjacent ranges, one between the areas a and b and another between the areas a and c. The adjacent ranges may have different colors, patterns, shapes, or the like so as to be distinguished from each other.

The pointer movable range display unit 18 may be included in the display device 50.

While the entire child screen is displayed on the parent screen at once when the PinP function is enabled in the above example, other configurations may be used. For example, the child screen may be gradually displayed.

Figure 14:
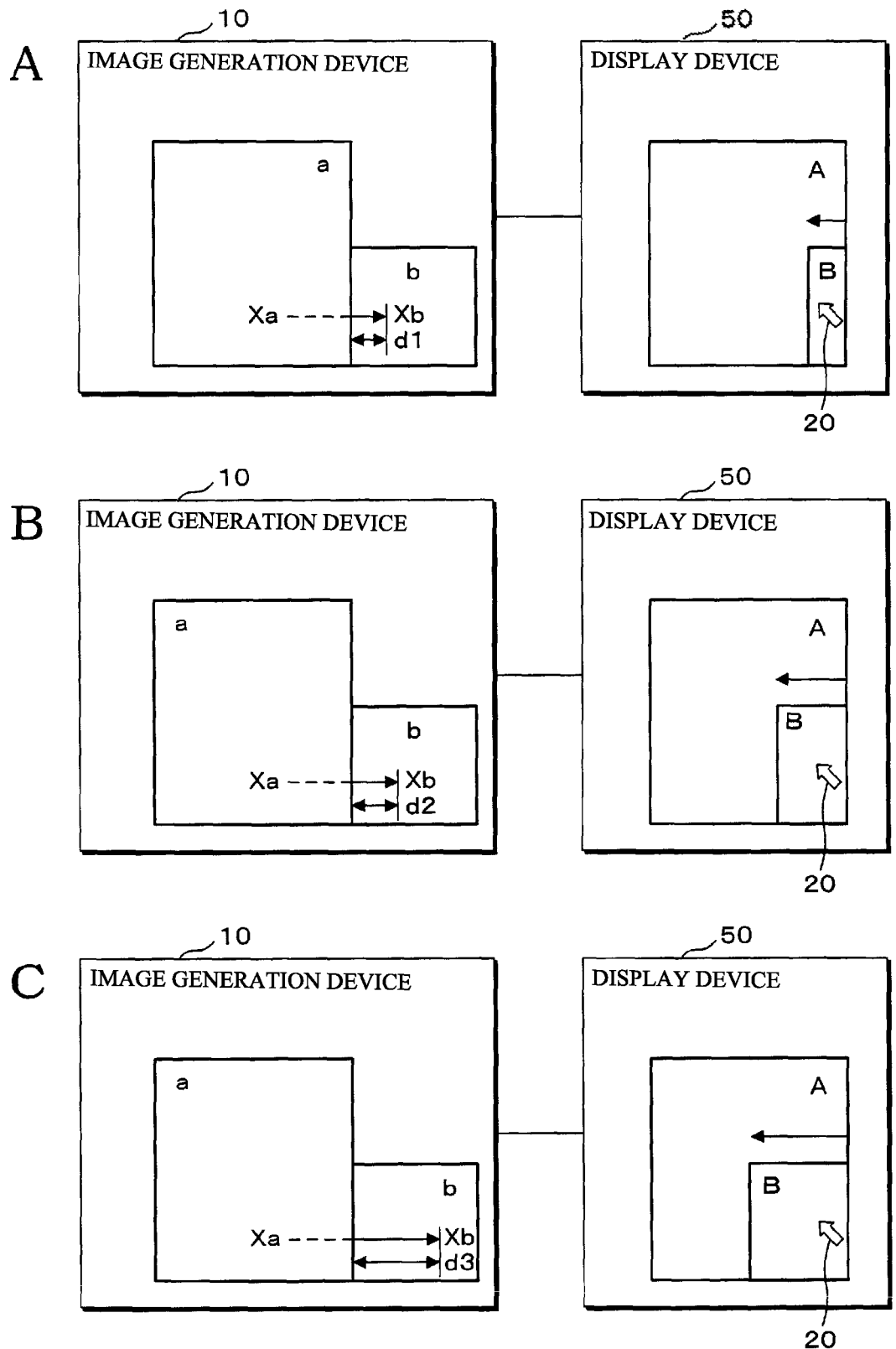
FIGS. 14A to 14C are schematic diagrams showing other example methods for displaying a child screen.

FIGS. 14A to 14C are schematic diagrams showing another example method for displaying a child screen. The left diagrams of FIGS. 14A to 14C each show the moving distance of the pointer position, and the right diagrams thereof each show the display state of the display area B (child screen).

The pointer moving distance calculation unit 19 calculates the moving distance of the pointer position. More specifically, when the pointer position moves from the area a to the area b, the pointer moving distance calculation unit 19 calculates the distance from the boundary between the areas a and b to the pointer position in the area b.

The simultaneous display command generation unit 17 determines the expansion length with which the display area B (child screen) expands in the display area A (parent screen), in accordance with the moving distance calculated by the pointer moving distance calculation unit 19 and then outputs a PinP function enable command along with the determined expansion length to the display device 50.

As shown in FIG. 14A, when the moving distance of the pointer position is d1, the expansion length of the display area B is not so long. As shown in FIG. 14B, when the pointer position further moves and thus the moving distance becomes d2 (>d1), the expansion length of the display area B becomes longer. As shown in FIG. 14C, when the pointer position further moves and thus the moving distance becomes d3 (>d2), the expansion length of the display area B becomes much longer.

In this case, the pointer 20 stays in approximately the same position on the display screen regardless of the moving distance of the pointer position. Thus, the user is prevented from losing sight of the pointer 20 and can perform an intuitive operation. It is also possible to minimize the area of the parent screen hidden by the child screen. If any of the parent screen and child screen is scaled up or down on the display device, the moving distance is calculated considering the scale-up or scale-down rate.

Figure 15:
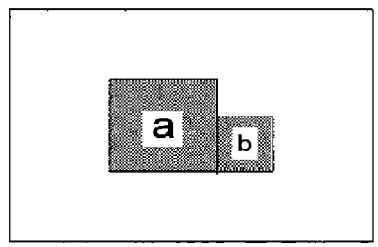
FIGS. 15A to 15C are schematic diagrams showing other example methods for displaying a child screen.
Figure 15:
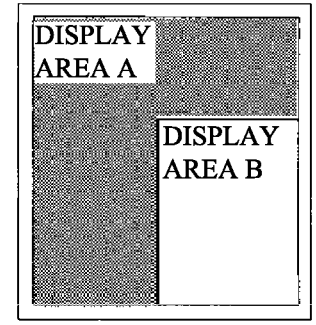
Figure 15:
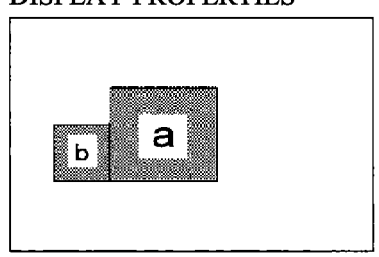
Figure 15:
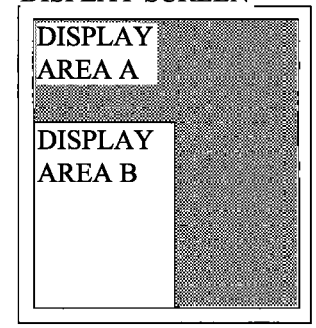
Figure 15:
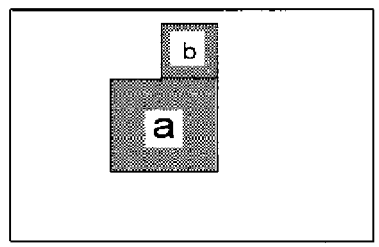
Figure 15:
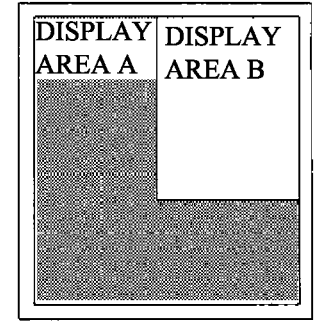
Figure 16:
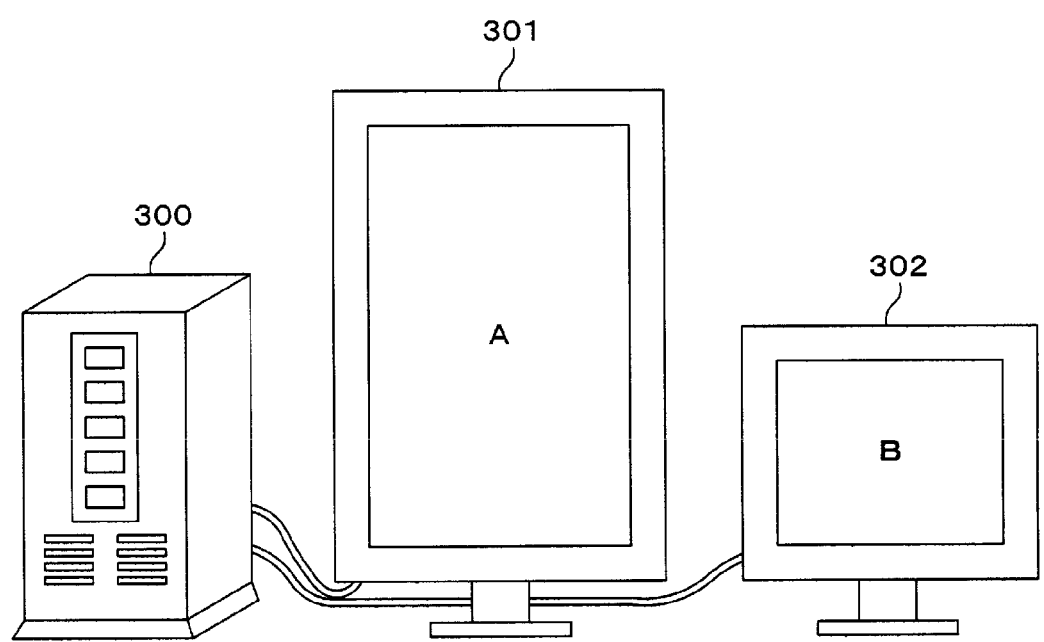
FIG. 16 is a schematic diagram showing an example configuration of a traditional image display system.

FIGS. 15A to 15C are schematic diagrams showing other example methods for displaying a child screen. The left diagrams of FIGS. 15A to 15C show the aspect of the display properties, that is, examples of the positions of the areas a and b set on the Display Properties/Settings window shown in FIG. 3, and the right diagrams thereof each show the aspect of the display screen. A shaded portion in each area schematically shows luminance. The display area A is displayed with the same luminance as that of the area a shown in the Display Properties/Settings window, that is, that of the area a generated by the image generation device 10, and the display area B is displayed with higher luminance than that of the area b.

Thus, the child screen displayed based on the movement of the pointer and the parent screen are clearly distinguished from each other, allowing the user to perform an operation without being puzzled by the sudden display of the child screen. The child screen may be displayed with luminance which is suitable for display images on the child screen. For example, images mainly including text place a smaller burden on the eyes of the user when displayed at low luminance; images mainly including photographs or moving images look better when displayed at high luminance.

Image quality control as described above is useful in the medical field, where X-ray images are mainly used as display images. In the medical field, it is a common practice to display X-ray images at high luminance to represent subtle shades of the images. Assuming that the parent screen is used to display X-ray images whose predominant color is black and that the child screen is used to display text images whose predominant color is white, when the child screen is displayed in a PinP manner at high luminance which is most suitable for X-ray images, the user may not visually recognize text images due to the brightness. In this case, by displaying the display area B serving as a child screen at lower luminance than that of the area b, as opposed to the above example, the parent screen and child screen can be displayed simultaneously without losing visibility.

Setting of luminance may be performed manually by the user or may be to automatically determine the contents of display images and then to set luminance which is suitable for the determined contents. Luminance control may be performed in the display device 50 or may be performed by hardware (graphic card) or software in the image generation device 10. Further, not only luminance but also any kind of display-related image quality, such as gradation characteristics, chromaticity, or sharpness, may be controlled. In addition to the image quality of the child screen, that of the parent screen may also be controlled, for example, using display or non-display of the child screen as a trigger.

As described above, according to the present embodiment, only by moving the pointing device such as the mouse or touchpad, the user can enable or disable the PinP function. That is, the user can operate the display device simply and intuitively, in other words, with significantly enhanced ease of use.

While the desktop is used as a working area using the multi-monitor function in the above embodiment, a virtual desktop including multiple desktops (e.g., the work space of Linux®) may be used as a working area using software (application, operating system, or the like). In this case, the image generation device 10 outputs only a desktop image (a virtual desktop image) to the display device 50 and therefore it has to be provided with a function equivalent to the PinP circuit 53.

In the above embodiment, when the PinP function is disabled and the user moves the pointer position across the adjacent range in which the area a corresponding to the parent screen and the area b corresponding to the child screen are adjacent to each other, the child screen is displayed. However, other configurations may be used. For example, there may be used a configuration where when the user attempts to move the pointer position out of the area a by moving it across the boundary of the area a which is not adjacent to the area b, the PinP function is enabled to display the child screen. In this case, there is no need to display the adjacent range M on the boundary of the display area A (parent screen).

DESCRIPTION OF NUMERALS

11, 51 control unit
12 input unit
13 working area generation unit
14 display properties setting unit
15 pointer position monitoring unit
16, 52 interface unit
17 simultaneous display command generation unit
18 pointer movable range display unit
19 pointer moving distance calculation unit
53 PinP circuit
54 display screen

The invention claimed is:

1. A display control method for displaying image data on a display screen of a display device by an image generation device's outputting the image data to the display screen, the display control method comprising:
    displaying, on the display screen of the display device, a first display area and displaying a pointer on the first display area;
    a first step of determining that a pointer position has moved from a first working area to a second working area by the image generation device;
    in response to determining the pointer position has moved from the first working area to the second working area, outputting a first command by the image generation device to a PinP circuit, the first command causing the PinP circuit to superimpose a second display area on the first display area, and displaying, on the display screen, the first display area as well as the second display area superimposed on the first display area, wherein entire area of the second display area is displayed inside the first display area;

a second step of determining that the pointer position has moved from the second working area to the first working area by the image generation device;

in response to determining the pointer position has moved from the second working area to the first working area, outputting a second command by the image generation device to the PinP circuit, the second command causing the PinP circuit to hide the second display area, and hiding, on the display screen, the second display area displayed inside the first display area; and keeping a display condition that the entire area of the second display area is displayed inside the first display area, until determining that the pointer position has moved from the second working area to the first working area, wherein the pointer position, the first working area and the second working area are generated in a memory stored in an image generation device, and are not displayed on the display screen, the pointer position is defined on the first and second working area, each coordinate of the pointer position in the first working area is mapped onto each displayed position of the pointer in the first display area, each coordinate of the pointer position in the second working area is mapped onto each displayed position of the pointer in the second display area, and in the first step, the second display area onto which the second working area is mapped is not displayed on the display screen, wherein the PinP circuit is embedded in the display device.

2. The display control method of claim 1, further comprising displaying, on the display screen, a boundary between the first display area and the second display area, and the boundary is displayed inside the first display area.

3. The display control method of claim 2, wherein displaying the boundary comprises displaying the boundary inside the first display area and at an edge of the second display area when the second display area is displayed.

4. The display control method of claim 1, further comprising: displaying a boundary between the first display area and the second display area when the second display area is not displayed.

5. The display control method of claim 1, further comprising:

setting a positional relationship between the first display area and the second display area; and determining a display position of the second display area with respect to the first display area on the basis of the positional relationship set in the setting step.

6. The display control method of claim 1, further comprising:

calculating a moving distance of the pointer from the first display area to the second display area; and adjusting a range of the second display area displayed on the display screen in accordance with the moving distance calculated in the calculating step.

7. The display control method of claim 1, further comprising controlling image quality of at least one of the display areas.

8. A non-transitory computer readable medium for causing a image display system to:

display, on a display screen of a display device, a first display area and displaying a pointer on the first display area;

determine that a pointer position has moved from a first working area to a second working area;

in response to determining the pointer position has moved from the first working area to the second working area, output, by an image generation device to a PinP circuit embedded in the display device, a first command causing the PinP circuit to superimpose a second display area on the first display area, and display, on the display screen of the display device, the first display area as well as the second display area superimposed on the first display area, wherein entire area of the second display area is displayed inside the first display area;

determine that the pointer position has moved from the second working area to the first working area;

in response to determining the pointer position has moved from the second working area to the first working area, output, by the image generation device to the PinP circuit embedded in the display device, a second command causing the PinP circuit to hide the second display area, and hide on the display screen of the display device, the second display area displayed inside the first display area; and keep a display condition that the entire area of the second display area is displayed inside the first display area, until determining that the pointer position has moved from the second working area to the first working area, wherein the pointer position, the first working area and the second working area are generated in a memory stored in the image generation device, and are not displayed on the display screen, the pointer position is defined on the first and second working area, each coordinate of the pointer position in the first working area is mapped onto each displayed position of the pointer in the first display area, each coordinate of the pointer position in the second working area is mapped onto each displayed position of the pointer in the second display area, and in a step of determining that the pointer has moved from the first working area to a second working area, the second display area onto which the second working area is mapped is not displayed on the display screen.

9. An image display system for displaying image data on a display screen of a display device by an image generation device's outputting the image data to the display screen, the image display system comprising:

the display device;

the display screen;

a PinP circuit embedded in the display device;

a display control device configured to display, on the display screen of the display device, a first display area and a display pointer on the first display area; and a pointer position monitoring unit configured to determine that a pointer position has moved from a first working area to a second working area and to determine that the pointer position has moved from the second working area to the first working area, wherein when it is determined by the pointer position monitoring unit that the pointer position has moved from the first working area to the second working area, the image generation device outputs a first command to the PinP circuit causing the PinP circuit to superimpose a second display area on the first display area, and the PinP circuit displays, on the display screen, the first display area as well as the second display area superimposed on the first display area, wherein entire area of the second display area is displayed inside the first display area;

wherein when it is determined by the pointer position monitoring unit that the pointer position has moved from the second working area to the first working area, the image generation device outputs a second command to the PinP circuit causing the PinP circuit to hide, on the display screen, the second display area displayed inside the first display area, wherein until it is determined by the pointer position monitoring unit that the pointer position has moved from the second working area to the first working area, the display control device keeps a display condition that the entire area of the second display area is displayed inside the first display area, wherein the pointer position, the first working area and the second working area are generated in a memory stored in the image generation device, and are not displayed on the display screen, the pointer position is defined on the first and second working area, each coordinate of the pointer position in the first working area is mapped onto each displayed position of the pointer in the first display area, each coordinate of the pointer position in the second working area is mapped onto each displayed position of the pointer in the second display area, and wherein the display control device is configured not to display the second display area, onto which the second working area is mapped, on the display screen when the pointer position monitoring unit determines that the pointer has moved from the first working area to a second working area.

\* \* \* \* \*